United States Patent

Shibata

[15] 3,635,389

[45] Jan. 18, 1972

[54] HEADING MACHINE
[72] Inventor: Akira Shibata, Tokyo, Japan
[73] Assignee: Chugai Denki Kogyo Kabushiki Kaisha, Tokyo, Japan
[22] Filed: Nov. 27, 1968
[21] Appl. No.: 779,546

Related U.S. Application Data

[62] Division of Ser. No. 486,621, Sept. 13, 1965, Pat. No. 3,460,735.

[52] U.S. Cl. ........................228/3, 10/27, 29/34, 29/470, 29/630, 72/332, 72/335, 228/18
[51] Int. Cl. ........................B23k 21/00, B23p 3/02
[58] Field of Search ..................228/3, 18; 29/34, 470, 630; 72/332, 335; 10/27

[56] References Cited

UNITED STATES PATENTS 3,026,603  3/1962  Zysk ........................29/630
3,311,965  4/1967  Gywn........................228/3
3,460,735  8/1969  Shibata......................228/18

*Primary Examiner*—John F. Campbell
*Assistant Examiner*—Robert J. Craig
*Attorney*—McGlew and Toren

[57] ABSTRACT

A heading machine for joining and shaping, by cold welding under pressure, cut lengths of wire of respectively different metal compositions is disclosed as including means for feeding continuous wires of the different metal compositions, means for severing that short lengths of the different wires, means for positioning and retaining the short lengths in axial alignment with each other, pressure means for forcing the cut ends of the short lengths of wire into abutment to cold weld the short lengths to each other, and shaping means operable to deform and "head" one end of the joined short wire pieces, these means being mounted on a mounting means which is arranged to be stepped along a path of travel past plural working stationed in uniformly spaced relation.

3 Claims, 4 Drawing Figures

PATENTED JAN 18 1972

INVENTOR.
AKIRA SHIBATA
BY McGlew and Toren
ATTORNEYS

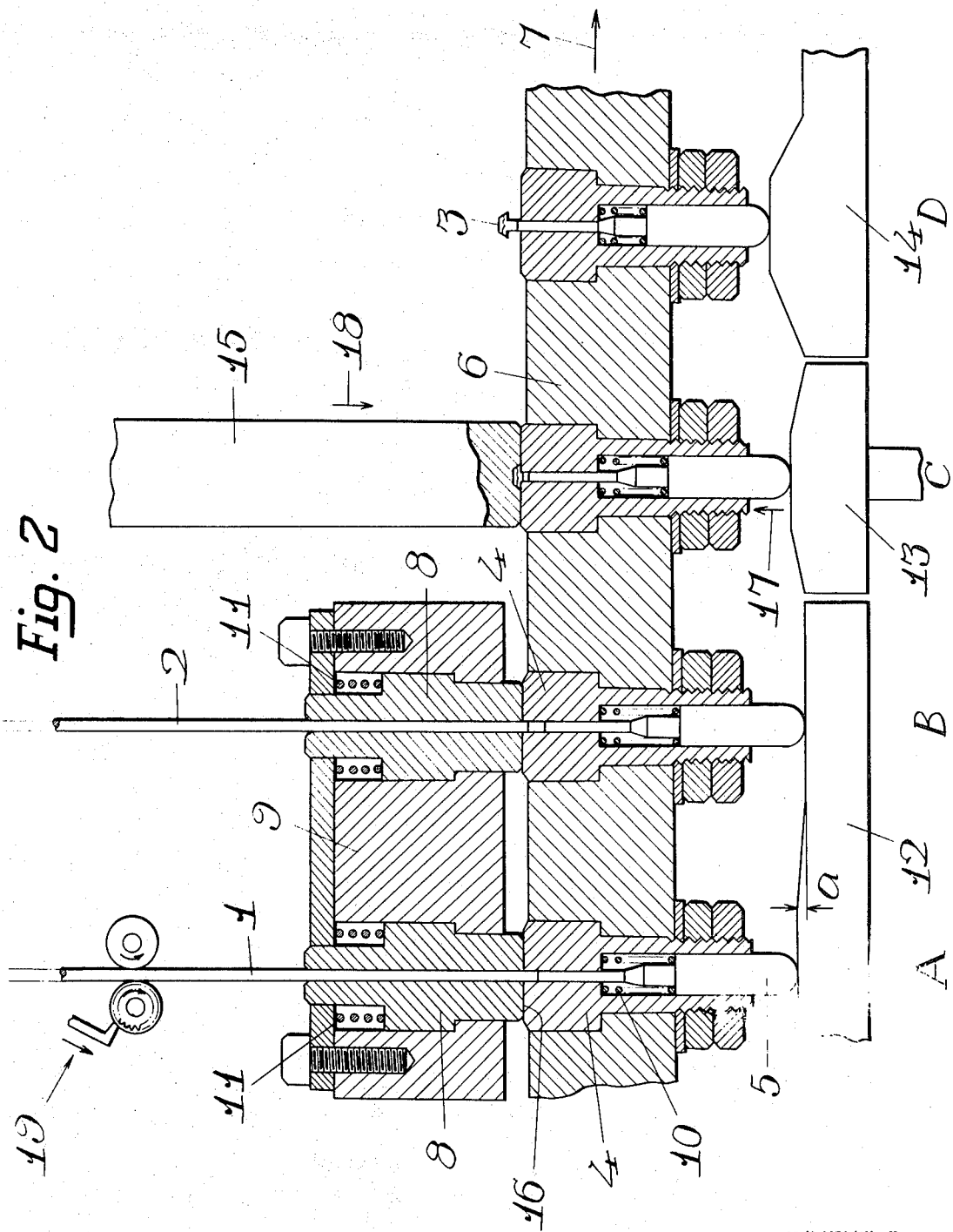

HEADING MACHINE

The present application is a division of my copending application Ser. No. 486,621 filed Sept. 13, 1965, now U.S. Pat. No. 3,460,735.

BRIEF SUMMARY OF THE INVENTION

This invention relates to a heading machine, more particularly, to a machine for use in heading a metal piece in which a metal piece, such as a cut wire rod, is headed with a metal piece, such as a cut wire rod consisting of different kind of metal, and simultaneously the headed metal piece thus obtained is pressed to a desired form.

Thus, the present invention consists in a heading machine of the kind in which a number of metal pieces consisting of different kinds of metal are joined together at the same time that they are pressed; and an object thereof is to provide a machine for manufacturing headed metal products, such as an electric contact made from cheap or base metal joined to costly precious metal, thereby to reduce the cost of such metal headed products, and also a heading machine for producing such products in large quantities automatically and successively.

Another object of the present invention is to provide a machine for joining and shaping a number of metal pieces consisting of different kinds of metal each having different physical properties to produce, efficiently and in large quantities, various kinds of metallic parts having a specific physical property which may prove to be effective in use and advantageous from the point of view of machine engineering.

In the drawings:

FIG. 2 is a partly sectional view showing an embodiment of the machine according to the present invention;

The structure and working of the present invention will now be described with reference to the attached drawing showing a preferred embodiment thereof.

Figure 1:
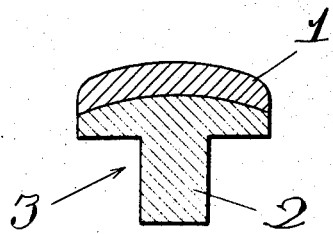
FIG. 1 is a longitudinal cross section of a rivet-type electric contact showing an example of the products manufactured in accordance with the present machine.

By way of giving a concrete example, initial consideration will be given to a heading machine in the specific case where a base material 2, such as a copper wire rod, is headed with a contact portion 1 consisting of precious metal, such as silver, and shaped as a whole to form a rivet-type electric contact 3 as shown in FIG. 1.

Figure 3:
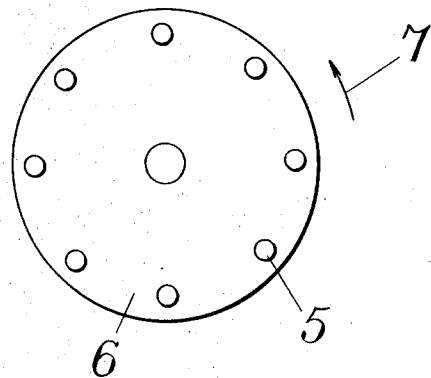
FIG. 3 is a view illustrating the arrangement of the principal members of the machine shown in FIG. 2.

Referring to an embodiment of the present invention shown in FIGS. 2 and 3, a number of pin sleeves 4, each having a pressing pin 5 slidably mounted therein, are fitted with equal circumferential spacings on the perimeter of a rotary disc 6 arranged to be turned stepwise, or intermittently, in the direction indicated by the arrow 7, and then stopped. Two or more wire piece supplying sleeves 8, having the same circumferential spacing as the pin sleeves 4 are arranged each to abut on the upper surfaces or two or more adjacent pin sleeves in axially aligned relationship therewith and held in position by the wire sleeve retainer piece 9 positioned above the rotary disc 6.

Pressing pin 4 are biased upwardly by spring 10, and the wire piece supplying sleeves 8 are biased downwardly by spring 11.

The wire piece supplying sleeves 8 are provided with central bores for receiving wires of different kinds of metal each adapted to be inserted at the outer ends into the central bores of the pin sleeves 4 abutting the wire piece supplying sleeves 8.

As the rotary disc 6 is rotated in the direction shown by the arrow 7, the lower ends of the pressing pins 5 slide on the surface of the cam 12 placed directly below the periphery of the disc and, in accordance with the variations in the level of the cam surface, pins 5 are moved in and out of the pin sleeves 4. Numeral 15 is a die, 13 a metal bearing fixture provided on the cam and 14 an extruder or ejector cam.

As the rotary disc 6 is rotated and the pin sleeve 4 moved speedily and with great force from the position A, the copper wire length 1 inserted into the wire piece supplying sleeve 8 and projecting partly into the pin sleeve 4 is cut on the abutting surface 16 of the wire supplying sleeve 8 and pin sleeve 4, and the copper wire piece 1 inserted in the bore of the pin sleeve 4 arrives at the position B as the rotary disc 9 is rotated by one step.

The pin 5 slides on the surface of the cam 12 and is depressed by the distance $a$. At this juncture, the silver wire 2 is inserted into the bore of the pin sleeve 4. As the rotary disc is rotated further by one step, the silver wire cut on the abutting surface of the wire supplying sleeve 8 and pin sleeve 4, and the piece of silver wire 2 inserted into the bore of the pin sleeve 4 arrives at the position C. Cutting copper wire 11 and silver wire 9 on respective different axial lines, in the manner just mentioned, is advantageous in that the cut length of the two wires can be varied at will by suitable selection of the dimensions of cam 12. Moreover, moving the cut copper and silver wires inserted into the bore of pin sleeve 4 to a position in line with die 15, besides being conducive to improvement in the production rate, has the advantages that the cut surfaces can be maintained in the fresh state without being abraded by other guiding means over a relatively long period of time, and that oxidation of the cut surfaces can be reduced to a minimum due to the high-speed stepped rotation of rotary disk 6, which results in a reduction of the time required to shape the cut copper and silver wires. Right at the position C, the pin 5 engages the metal-bearing fixture 13 and is projected in the direction shown by the arrow 17, forcing the silver wire piece, and copper wire piece inserted into the central bore of the pin sleeve 4, outwardly of the central bore of the pin sleeve 4. At this juncture, the metal die 15 impinges several times successively on the copper and silver wire pieces placed end to end, in the direction shown by the arrow 18, so that the silver and copper wire pieces are shaped to a configuration such that the weld has a cross-sectional area larger than that of the copper or silver wire. This shaping occurs at the same time that they are cold welded together. It is to be understood that the silver and copper wire pieces may be struck several successive time by the metal die 15 while projected from the central bore of the sleeve 4. Thereafter, the rotary disc is rotated further one step in the direction shown by the arrow 7, just as formerly, and as the pin sleeve arrives at the position D, the pin 5 is positioned above the extruder cam 14 and is projected further outwardly in the direction indicated by the arrow 18, ejecting the headed metal product 3 as an unit.

Figure 4:
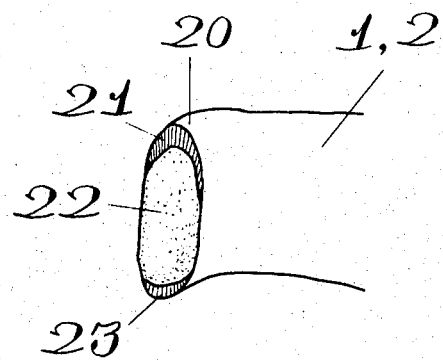
FIG. 4 is a perspective view of a cut wire.

While the present invention has been described with reference to an embodiment thereof, the term "cut surfaces" as mentioned hereinabove will be explained in detail. It is a well-known fact that wire, when cut, generally has the sectional shape shown in FIG. 4. In FIG. 4, 20 indicates a rounded edge, 21 a cut surface, 22 a cleavage or fractured surface and 23 a burr. It is the fractured surface 22 that is to be cold welded most securely by means of the invention apparatus. Immediately after cutting, temperature on this section of the wire is raised due to the heat generated by the cleavage. Moreover, this section or surface 22 is clean and highly activated. If viewed microscopically, it is a very rugged surface which even further increases the superficial measure of the activated surface. These features of the cleavage surface provide the advantage of the present invention whereby the most securely welded joints can be obtained notwithstanding the relatively small degree of deformation, as involved in the cold welding process of the invention.

Conversely, with this degree of deformation, it is not possible to weld surfaces other than the fractured surfaces such as, for instance, the relatively glossy cut surfaces 21, even if such surfaces are to be cold pressure welded together. Even if cleaned by suitable methods, such as electrolysis or scraping, these glossy cut surfaces cannot be pressure welded with the degree of deformation of the invention. Thus, the larger the superficial content of the fractured surface 22, the larger is the welding surface and consequently the stronger the weld. It is therefore desirable that this fractured surface 22 be increased in area.

In order to effect this, it is necessary to suitably select the spacing between the cutting edges to cut the wires, and also to increase the cutting speed. This is attained by the present invention and is one of the advantages of a production process according to the invention, providing for mass production in a very satisfactory manner. According to the present invention, rivet-shaped pressure welded electric contacts, having a strong weld and having a head 4 mm. across can be produced from metal wire having a 2 mm. diameter. This feature is another advantage of the present invention considering that pieces of wire cannot be pressure welded together with this degree of deformation by means of conventional processes wherein two pieces of wire are butt welded together.

Moreover, inasmuch as the method of the present invention enables pressure welding with a relatively small degree of deformation, pieces of wire produced by the process of powder metallurgy such as, for instance, silver-nickel, may be employed to form pressure welded contacts without formation of such defects as breakage or cracks. This is an additional advantage of the present invention.

While the description has been directed to the case of cold welding and shaping of metal pieces consisting of two different kinds of metal placed end to end and aligned axially, it is to be noted that cold welding and shaping of three or more metal pieces, each consisting of a different kind of metal, placed end to end and aligned axially may also be carried out in the like manner. Also heat may be applied externally by means of an electric heater and the like at the time that the metal pieces are pressed together to promote the joining and shaping operations. It is also to be stated that the joining operation may desirably be carried out under neutral atmospheric conditions to prevent oxidation of the metal pieces to be subjected to the operation.

It is obvious that the machine as described has advantageous features such as lowered production cost resulting from the use of base metal instead of more costly metal in the production of a metallic part which has been composed formerly as a whole from a single expensive metal, with the expensive metal used only in the important part of the metal part, and the automatic and continuous operation in the production process of such metallic part, thus contributing to an increase in the production rate.

What is claimed is:

1. A heading machine for joining and shaping under pressure at least two metal pieces, such as cut lengths of wire, of respectively different metal compositions, abutted in axially aligned end-to-end relation, said heading machine comprising, in combination, a chuck means having plural sleeves formed with bores and including pins displaceable longitudinally of said bores; means mounting said sleeves in uniformly spaced relation for movement along a path of travel past plural working stations having spacings along the path equal to the spacings of said sleeves; said mounting means being arranged to be stepped along said path, with each step being equal in length to the spacing between said sleeves; wire guide means being positioned at least the first and second stations along said path; a shaping means having a heading die positioned at a further station along said path beyond said second station; each pin being retracted inwardly of its associated bore at said first station and the wire guide means and feeding means at said first station feeding a length of first wire into the bore of the sleeve then as said first station and into engagement with the pin; said first wire being severed to form a first cut wire piece by relative movement of said wire guide means and sleeve at said first station; the pins at said second station being further retracted into the associated bores to move the first cut wire pieces further inwardly in the associated bores, and the wire guide and feeding means at said second station feeding a second length of wire into the bore of the sleeve then at said second station and into engagement with the first cut wire piece; the second length of wire being severed by relative movement of the wire guide means and sleeve at said second station to form a second cut wire piece in the bore of the sleeve and abutting said first cut wire piece in the bore; the pin in the sleeve at said further station being moved outwardly in its associated bore to engage the second cut wire piece in said heading die under pressure to cold weld unite the two cut wire pieces to form a composite member and to shape the projecting end of the composite member into a head; the pin in the sleeve at a station beyond said further station being further advanced outwardly in its associated bore to eject the finished product from the associated sleeve.

2. A heading machine, as claimed in claim 1, including respective cam surfaces at each of said stations and means biasing said pins into engagement with said cam surfaces effecting the relative longitudinal movement of said pins in the associated bores.

3. A heading machine, as claimed in claim 1, in which said means mounting said sleeves comprises a circular disk mounted for rotation; said sleeves being mounted adjacent the periphery of said disk for travel in a circular path.

* * * * *